June 10, 1930.  E. LARSON  1,762,517
CREAM SIPHON
Filed April 4, 1928
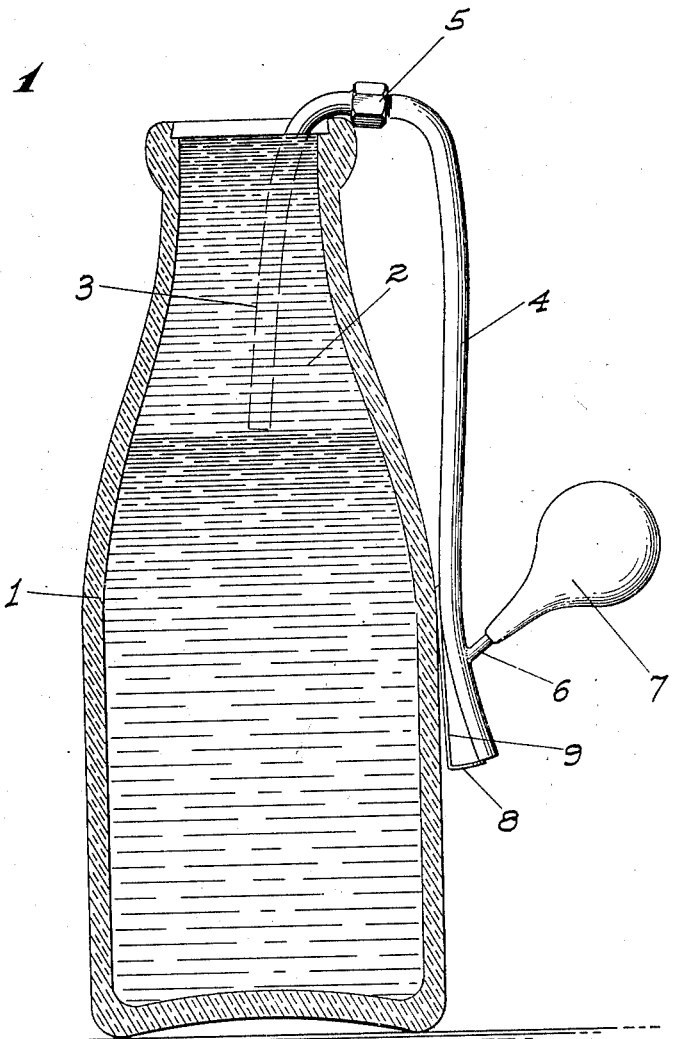
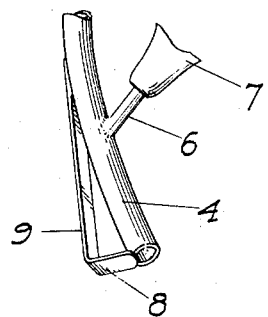
INVENTOR
*Ernest Larson*
BY
ATTORNEY Patented June 10, 1930

1,762,517

UNITED STATES PATENT OFFICE

ERNEST LARSON, OF TURLOCK, CALIFORNIA

CREAM SIPHON

Application filed April 4, 1928. Serial No. 267,267.

This invention relates to household appliances and particularly to a device for removing the cream from the top of a standard milk bottle of that character in which milk is now universally distributed to the individual consumer.

The principal object of my invention is to provide a siphon device for this purpose by means of which all the cream in the bottom may be easily and quickly withdrawn without disturbing the milk, without spilling any of the cream, and which is provided with a mechanical means for starting the siphoning action, so that the use of mouth suction and contact with the device is not necessary.

A siphon operating on the same principle may, however, be made in larger sizes for irrigating purposes as will be seen from the description hereinafter set forth.

A further object of the invention is to produce a simple and inexpensive device and yet one which will be exceedingly effective for the purposes for which it is designed.

These objects I accomplish by means of such structure and relative arrangement of parts as will fully appear by a perusal of the following specification and claim.

In the drawings similar characters of reference indicate corresponding parts in the several views:

Fig. 1 is a sectional elevation of a standard milk bottle showing my improved siphon device as associated therewith.

Fig. 2 is a fragmentary perspective view of the lower end of the siphon showing the closure or valve member.

Referring now more particularly to the characters of reference on the drawings, the numeral 1 denotes a standard milk bottle in the top of which the cream 2 collects to a certain depth as usual if the bottle is left standing for a certain length of time.

The siphon device comprises an inverted U shaped tube member having a short leg 3 to depend into the bottle to approach the division line between the cream and milk, and a long leg 4 to be disposed outside the bottle and which is bent outwardly of the bottle toward its lower end as shown. This tube is preferably made of two parts connected by a screw union fitting 5 or the like, which is disposed between the legs so that they can be easily separated from each other for thorough cleaning when necessary. Toward the lower end of the outer leg 4 of the siphon a relatively small short tube 6 is connected to said leg, the tube having an upward slant. A small squeeze bulb 7 is connected to the outer end of the tube, the capacity of this bulb being preferably not greater than the capacity of the main siphon tube.

A rigid closure flap 8 is provided adjacent the bottom of the leg 4, to close the same by a transverse movement, the flap being formed as a part of a spring member 9 which extends lengthwise of and is secured to the side of the leg nearest the bottle; and acting to hold the flap away from the open end of the leg.

In operation the bulb is first squeezed and held squeezed while the leg 3 is inserted in the bottle. The flap is then moved to a closing position and the bulb released. The bulb tending to reassume its normal expanded condition will set up a tendency to vacuum inside the siphon tube, which will cause the cream to be forced into the siphon tube by the action of the normal atmospheric pressure on the cream. This action will take place since the air cannot get into the siphon from outside the bottle or from the lower end of the siphon tube owing to the closed flap or valve 8. As soon as the cream moves around the tube to a point below the level of the short leg 3 (which will be almost instantly) the flap may be released and the cream will then flow from the lower end of the siphon into a vessel placed alongside the bottle to receive it, until all the cream has been removed. The lower end of the leg 4 being bent outwardly of the bottle, removes said end from the bottle a sufficient distance to avoid the possibility of the cream spilling between the bottle and the receptacle in which the cream is being received.

The capacity of the bulb being restricted as above stated, there is no danger of the cream being drawn into the same as it regains its normal condition. To clean the device the ends of the siphon tube may be submerged in water and the bulb used as a means to agitate the water and cause the same to be alternately drawn into and expelled from the tube, with an accompanying flushing and cleaning action.

The bulb tube having an upward slant, causes any liquid which may possibly be drawn up into the same to readily drain therefrom when the device is mounted in its operative position.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claim.

Having thus described my invention, what I claim as new and useful and desire to secure by Letters Patent is:

In a siphon having legs, a flap to cover the end of one leg, and a flat spring member extending alongside the leg and secured to the leg and to the flap to normally draw the flap laterally away from the end of the leg and also serving as a finger-pressure piece to move the flap to an end-closing position.

In testimony whereof I affix my signature.

ERNEST LARSON.